No. 648,097. Patented Apr. 24, 1900.
C. H. BENSON.
GATE.
(Application filed Jan. 4, 1900.)
(No Model.) 2 Sheets—Sheet 1.
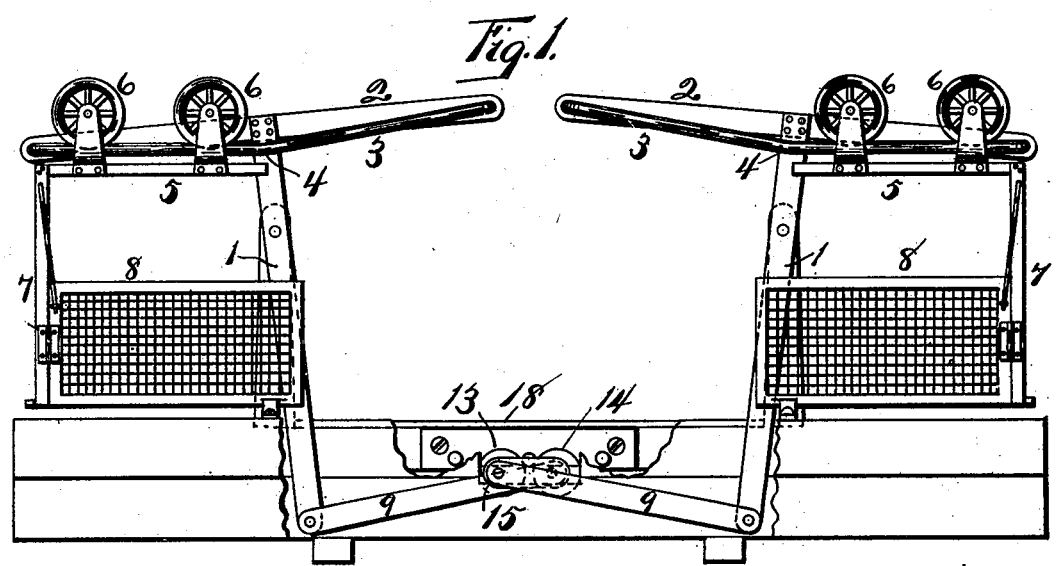
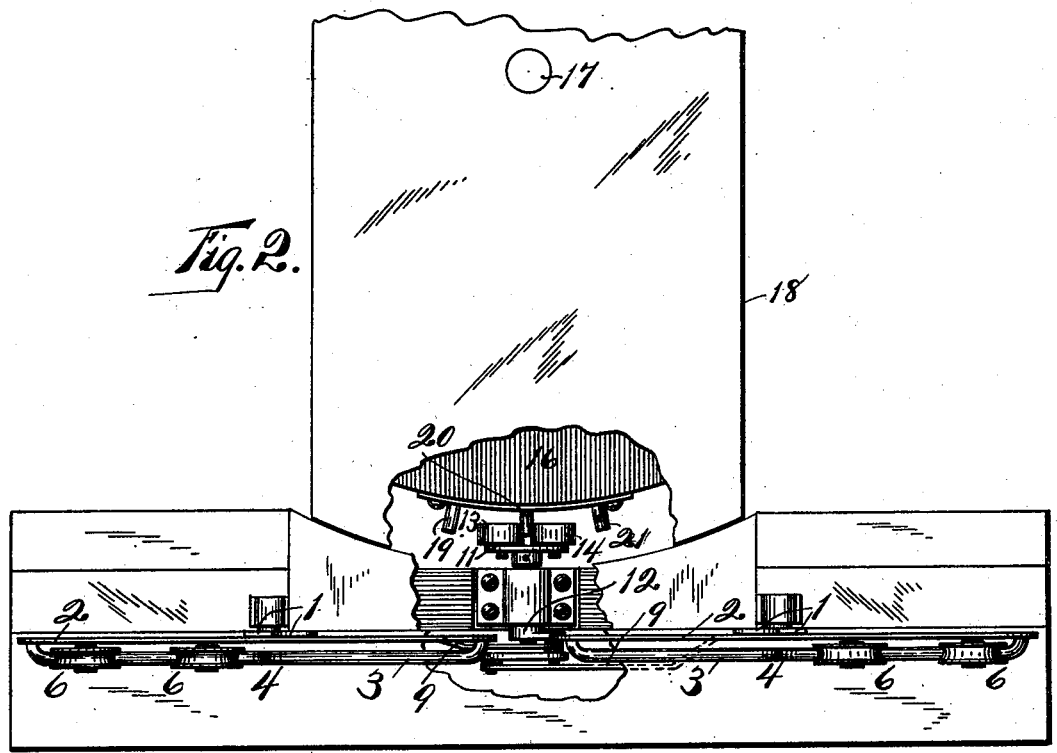
WITNESSES:
C. C. Schoeneck
M. M. Nott
INVENTOR
C. H. Benson
BY
Smith & Denison
ATTORNEYS.

No. 648,097. Patented Apr. 24, 1900.
C. H. BENSON.
GATE.
(Application filed Jan. 4, 1900.)
(No Model.) 2 Sheets—Sheet 2.
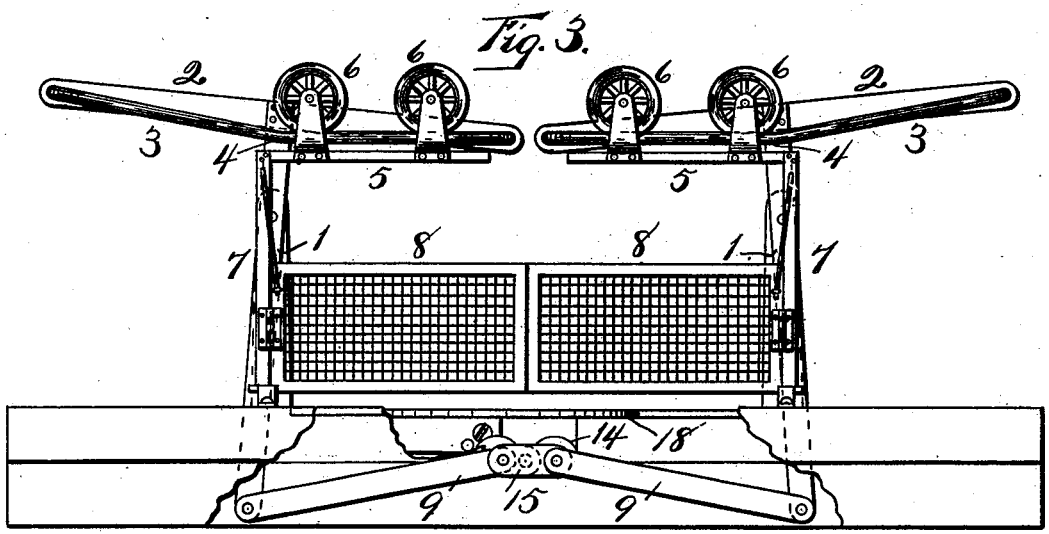
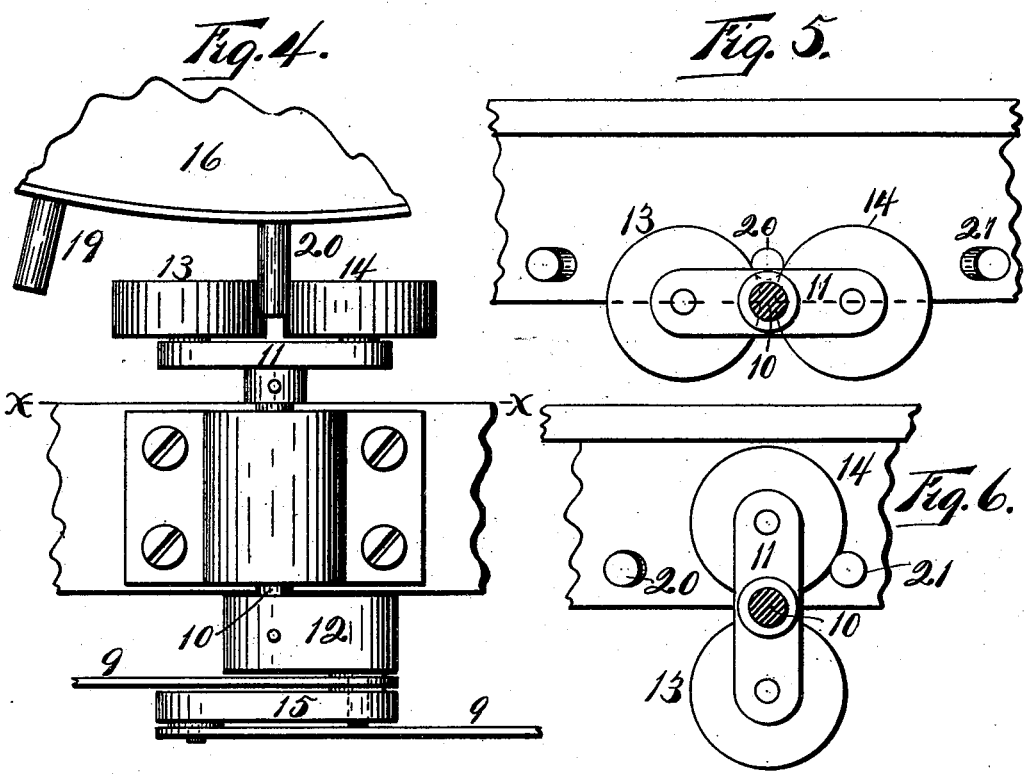
WITNESSES:
C. A. Schoeneck
M. M. Nott
INVENTOR
C. H. Benson
BY
Smith & Davidson
ATTORNEYS.

UNITED STATES PATENT OFFICE.

CHARLES H. BENSON, OF NORWICH, NEW YORK.

GATE.

SPECIFICATION forming part of Letters Patent No. 648,097, dated April 24, 1900.

Application filed January 4, 1900. Serial No. 315. (No model.)

*To all whom it may concern:*

Be it known that I, CHARLES H. BENSON, of Norwich, in the county of Chenango, in the State of New York, have invented new and useful Improvements in Gates, of which the following, taken in connection with the accompanying drawings, is a full, clear, and exact description.

This invention relates to improvements in the construction and operation of gates, having more particular reference to that class of gates which are used for closing the passage-way across waterways.

My object is to construct a gate or a series of gates which will be operated by the swinging or hoisting of a bridge, such swinging or hoisting insuring the positive operation of the gates to close the passage-way. They may also be operated by hand or otherwise; and to that end my invention consists in the several new and novel features of construction and operation which are hereinafter described, and specifically set forth in the claims hereunto annexed.

It is constructed as follows, reference being had to the accompanying drawings, in which—

Figure 1 is an end view of the gate open and showing the end of the bridge. Fig. 2 is a top plan view thereof, showing the top of the bridge and the upper casing of the gate-base broken away to show its operating parts. Fig. 3 is a view similar to that shown in Fig. 1, except that the gate is closed. Fig. 4 is an enlarged view of the part which is shown in the center of Fig. 2, the end of the bridge, the pins, and the parts which operate the levers upon which the gates are mounted. Fig. 5 is a view on line $x$ $x$, Fig. 4, looking upward. Fig. 6 is a similar view showing the operating-arm turned quarter-way around.

Similar numerals of reference indicate corresponding parts.

Upon the side of the passage-way leading to the waterway I pivot uprights 1, adapted to swing. These uprights may be pivoted to standards especially provided for the purpose or in any manner desired. To the upper end of the uprights I secure cross-arms 2, which cross-arms are provided with a trackway 3, which incline to the central point 4.

I do not wish to be understood as limiting myself to providing the upright 1 with a cross-arm and then securing it to the trackway, as indicated, for it would be evident that the cross-arm itself may be constructed to form a trackway.

5 is an ordinary hanger provided with wheels or rollers 6, adapted to travel upon the trackway, and to the hanger 5 I secure a frame 7, which carries a swinging gate 8 or any other lattice-work which shall serve as a guard to prevent passage-way. To the lower end of the uprights 1 I hinge bars 9.

Beneath the passage-way or road-bed I rotatingly mount a shaft 10, having a T-head 11 at one end and a crank-arm 12 at the other. Upon each end of the head 11 I mount rollers 13 and 14, and to the outer end of the crank-arm 12 I secure an oppositely-extending crank-arm 15. To the outer end of the crank-arm 12 I pivot the inner end of one of the bars 9, and the other bar is pivoted to the outer end of the crank-arm 15, as shown in Fig. 4, so that by the rotation of the shaft 10 the bars 9 will move in opposite directions.

16 is the bridge swinging upon the pivot 17 in the ordinary way, 18 being the upper surface. To the end of the bridge I secure circular pins 19, 20, and 21.

My invention is operated as follows: Assume that the gates and all of the parts are in the position shown in Figs. 1 and 2, the bridge being closed and the gates open. When I desire to close the gates and open the bridge by the rotation of the bridge in either direction, the pin 20 comes in contact with either the roller 13 or 14, according to the way it is swung. In Figs. 5 and 6 I show the pin 20 about to move toward the left. This throws the roller 13 down, and the pin 21 then engages the roller, as shown in Fig. 6, and continues the rotation. This causes the shaft 10 to rotate and by the intermediate connection of crank-arms operates the bars 9, which in turn tilt the uprights 1. When the uprights 1 are tilted toward each other, they take the position shown in Fig. 3 and form an incline of the trackway 3 toward the center and allow the gates to close, as shown in said Fig. 3. When the bridge is swung in the reverse direction or is closed, the pins operate to reverse the shaft and cause the uprights to be tilted, as shown in Fig. 1, when the gates roll back open.

It will be observed that this same construction of gate may be used in a hoist-bridge by providing different means of operating or rotating shaft 10.

I do not limit myself to the precise construction and combination of parts herein shown, as their mechanical equivalents may be used with the same force and effect.

Having described my invention, what I claim, and desire to secure by Letters Patent, is—

1. A gate of the class described comprising pivotally-mounted uprights having a trackway secured transversely to the upper end thereof, trucks traveling on said trackway and carrying gates adapted to move to and fro with the tilting of the uprights, and means for tilting said uprights.

2. A gate of the class described comprising pivotally-mounted uprights having trackways secured transversely to the upper ends thereof, trucks mounted on said trackways and carrying gates adapted to move to and fro with the tilting of said uprights, and a shaft suitably mounted and provided with crank-arms at one end, bars connecting the lower end of the uprights with said crank-arms, and means at the other end of said shaft for operating it.

3. A gate of the class described comprising pivotally-mounted uprights having a trackway secured transversely to the upper ends thereof, trucks traveling on said trackway and carrying gates adapted to move to and fro with the tilting of said uprights, a shaft suitably mounted beneath the road-bed having one end provided with means for connecting the lower end of the uprights for the purpose of tilting them in opposite directions with the rotation of the shaft, and means upon the other end for rotating said shaft by the swinging of the bridge.

4. A gate of the class described comprising pivotally-mounted uprights having a trackway secured transversely to the upper ends thereof, trucks traveling on said trackway and carrying gates adapted to move to and fro with the tilting of said uprights, and a shaft suitably mounted beneath the road-bed and having means at one end for connecting the lower ends of the uprights for the purpose of tilting them in opposite directions, and the other end of said shaft being provided with a T-head and rollers, pins upon the bridge adapted to engage with said rollers for the purpose of rotating the shaft when the bridge is swung.

In witness whereof I have hereunto set my hand this 29th day of December, 1899.

CHARLES H. BENSON.

Witnesses:
FRANK SEABROOK,
IRA H. HYDE.